(12) United States Patent
Paul et al.

(10) Patent No.: US 12,438,858 B2
(45) Date of Patent: Oct. 7, 2025

(54) METHOD AND SYSTEM FOR A LATTICE-BASED HOMOMORPHIC PROXY RE-ENCRYPTION SCHEME

(71) Applicant: Tata Consultancy Services Limited, Mumbai (IN)

(72) Inventors: Arinjita Paul, Thane (IN); Rajan Mindigal Alasingara Bhattachar, Bangalore (IN); Imtiyazuddin Shaik, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 161 days.

(21) Appl. No.: 18/503,796

(22) Filed: Nov. 7, 2023

(65) Prior Publication Data

US 2024/0195618 A1    Jun. 13, 2024

(30) Foreign Application Priority Data

Dec. 12, 2022   (IN) .............................. 202221071716

(51) Int. Cl.
     *H04L 9/40*           (2022.01)
     *H04L 9/00*           (2022.01)
     (Continued)

(52) U.S. Cl.
CPC .......... *H04L 63/0471* (2013.01); *H04L 9/008* (2013.01); *H04L 9/14* (2013.01); *H04L 9/3093* (2013.01); *H04L 63/0428* (2013.01)

(58) Field of Classification Search
CPC ......... H04L 9/14; H04L 9/008; H04L 9/3093; H04L 9/0656; H04L 2209/76;
(Continued)

(56) References Cited

U.S. PATENT DOCUMENTS 9,083,526 B2 * 7/2015 Gentry .................... H04L 9/008
9,252,942 B2 * 2/2016 Zhang ..................... H04L 9/008
(Continued)

FOREIGN PATENT DOCUMENTS

CN      111586000 A    8/2020
CN      112152779 B    5/2022

OTHER PUBLICATIONS

Li, Juyan et al., "A Lattice-Based Homomorphic Proxy Re-Encryption Scheme with Strong Anti- Collusion for Cloud Computing", Title of the item: Sensors, Date: 2021, vol. 21; Issue: 1, Publisher: MDPI, Link: https://www.mdpi.com/1424-8220/21/1/288.

*Primary Examiner* — Shaqueal D Wade-Wright
(74) *Attorney, Agent, or Firm* — Finnegan, Henderson, Farabow, Garrett & Dunner, LLP

(57) ABSTRACT

The present disclosure a method for a lattice-based homomorphic proxy re-encryption scheme. Conventional methods are attribute based and the attribute-based encryption schemes employ very expensive operations and generate long ciphertexts and secret keys (whose sizes also increase linearly with the size of the access policy), which makes them hard to implement in real-life applications. The present disclosure provides a unidirectional, single-hop HPRE scheme from the Learning With Errors (LWE) assumption which is Chosen Plaintext Attack (CPA) secure. Further, the present disclosure is based on the widely accepted BGV algorithm that supports both levelled FHE operations as well as arbitrary number of ciphertexts with unique and secure re-encryption key generation. Further, the present disclosure provides batch evaluation of ciphertexts, in order to enable re-encryption and evaluation of multiple ciphertexts.

17 Claims, 5 Drawing Sheets

(51) Int. Cl.
*H04L 9/14* (2006.01)
*H04L 9/30* (2006.01)

(58) Field of Classification Search
CPC . H04L 63/04; H04L 63/0428; H04L 63/0464;
H04L 63/0471; G06F 21/62; G06F 21/60;
G06F 21/6218; H04W 12/03
See application file for complete search history.

(56) References Cited

U.S. PATENT DOCUMENTS

| | | | |
|---|---|---|---|
| 12,219,043 B1* | 2/2025 | Rososhek | H04L 9/008 |
| 2015/0381348 A1* | 12/2015 | Takenaka | H04L 9/3093 |
| | | | 380/30 |
| 2017/0155628 A1* | 6/2017 | Rohloff | H04L 63/02 |
| 2022/0173917 A1* | 6/2022 | Basu | H04L 63/1458 |

* cited by examiner

METHOD AND SYSTEM FOR A LATTICE-BASED HOMOMORPHIC PROXY RE-ENCRYPTION SCHEME

PRIORITY CLAIM

This U.S. patent application claims priority under 35 U.S.C. § 119 to: Indian Patent Application No. 202221071716, filed on Dec. 12, 2022. The entire contents of the aforementioned application are incorporated herein by reference.

TECHNICAL FIELD

The disclosure herein generally relates to the field of cryptography and, more particularly, to a method and system for a lattice-based homomorphic proxy re-encryption scheme.

BACKGROUND

Proxy Re-encryption (PRE) allows a semi-trusted third party called proxy to transform a ciphertext encrypted under a public key of a first party termed as delegator into a ciphertext decryptable under a new public key of the second party termed as delegatee, without revealing any information about the underlying message. The proxy is entrusted with a special information termed as re-encryption key or rekey that enables such a transformation. PRE has extensive applications cloud environment, distributed storage in blockchain-based systems, encrypted email forwarding, digital rights management, outsourced filtering of encrypted spam, revocation systems, network security among others. Because of the intrinsic key-switching property, PRE seems to be a natural solution towards enabling seamless sharing of encrypted data evaluated using Fully Homomorphic Encryption (FHE).

Conventional methods are identity based, and the attribute-based encryption schemes employ very expensive operations and generate long ciphertexts and secret keys (whose sizes also increase linearly with the size of the access policy), which makes them hard to implement in real-life applications. Further, the conventional systems do not support fine-grained operations on ciphertext and batch evaluation of ciphertexts.

SUMMARY

Embodiments of the present disclosure present technological improvements as solutions to one or more of the above-mentioned technical problems recognized by the inventors in conventional systems. For example, in one embodiment, a method for A lattice-based homomorphic proxy re-encryption scheme is provided. The method includes receiving, by a first client machine and a second client machine via corresponding one or more hardware processors, a plurality of public parameters from a trusted third party server, wherein the plurality of public parameters comprises a security parameter, a number of encryption levels and a bit value. Further, the method includes generating via one or more hardware processors of the first client machine, a first public-private key pair of a first user based on the plurality of public parameters and a user index using a probabilistic key generation algorithm. Furthermore, the method includes simultaneously generating via one or more hardware processors of a second client machine, a second public-private key pair of a second user based on the plurality of public parameters and the user index using the probabilistic key generation algorithm. Furthermore, the method includes generating via the one or more hardware processors of the first client machine, a ciphertext based on a plaintext associated with the first user, the public key from the first public-private key pair and the plurality of public parameters using a probabilistic encryption algorithm. Furthermore, the method includes transmitting via the one or more hardware processors of the first client machine, the ciphertext to a proxy server machine, wherein the ciphertext is received by the proxy server machine. Furthermore, the method includes performing a computation via one or more hardware processors of the proxy server machine, on the ciphertext using a Fully Homomorphic Encryption (FHE) based technique. Furthermore, the method includes generating via the one or more hardware processors of the first client machine, a re-encryption key based on the first public-private key pair of the first user, a public key of the second user and the plurality of public parameter using a probabilistic re-encryption key generation algorithm. Furthermore, the method includes transmitting via the one or more hardware processors of the first client machine, the generated re-encryption key to the proxy server machine, wherein the re-encryption key is received by the proxy server machine. Furthermore, the method includes generating via the one or more hardware processors of the proxy server machine, a re-encrypted ciphertext based on the re-encryption key, the ciphertext and the plurality of public parameters using a probabilistic re-encryption algorithm. Furthermore, the method includes transmitting via the one or more hardware processors of the proxy server machine, the re-encrypted ciphertext to the second client machine, wherein the re-encrypted ciphertext is received by the second client machine. Finally, the method includes generating by the one or more hardware processors of the second client machine, a resultant plaintext based on the re-encrypted ciphertext, and a private key of the second public-private key pair of the second user using a probabilistic decryption algorithm.

In another aspect, a system for a lattice-based homomorphic proxy re-encryption scheme is provided. The system includes a first client machine, a second client machine, a proxy server machine and a trusted third party server 108, wherein the proxy server machine, the first client machine and the second client machine comprises at least one memory storing programmed instructions; one or more Input/Output (I/O) interfaces; and one or more hardware processors of the proxy server machine, the first client machine and the second client machine are operatively coupled to a corresponding at least one memory, wherein the system is configured to receive, by a first client machine and a second client machine via corresponding one or more hardware processors, a plurality of public parameters from a trusted third party server, wherein the plurality of public parameters comprises a security parameter, a number of encryption levels and a bit value. Further, the system is configured to generate, via one or more hardware processors of the first client machine, a first public-private key pair of a first user based on the plurality of public parameters and a user index using a probabilistic key generation algorithm. Furthermore, the system is configured to simultaneously generate, via one or more hardware processors of a second client machine, a second public-private key pair of a second user based on the plurality of public parameters and the user index using the probabilistic key generation algorithm. Furthermore, the system is configured to generate, via the one or more hardware processors of the first client machine, a ciphertext based on a plaintext associated with the first user, the public key from the first public-private key pair and the plurality of public parameters using a probabilistic encryption algorithm. Furthermore, the system is configured to transmit, via the one or more hardware processors of the first client machine, the ciphertext to a proxy server machine, wherein the ciphertext is received by the proxy server machine. Furthermore, the system is configured to perform a computation, via one or more hardware processors of the proxy server machine, on the ciphertext using a Fully Homomorphic Encryption (FHE) based technique. Furthermore, the system is configured to generate, via the one or more hardware processors of the first client machine, a re-encryption key based on the first public-private key pair of the first user, a public key of the second user and the plurality of public parameter using a probabilistic re-encryption key generation algorithm. Furthermore, the system is configured to transmit, via the one or more hardware processors of the first client machine, the generated re-encryption key to the proxy server machine, wherein the re-encryption key is received by the proxy server machine. Furthermore, the system is configured to generate, via the one or more hardware processors of the proxy server machine, a re-encrypted ciphertext based on the re-encryption key, the ciphertext and the plurality of public parameters using a probabilistic re-encryption algorithm. Furthermore, the system is configured to transmit, via the one or more hardware processors of the proxy server machine, the re-encrypted ciphertext to the second client machine, wherein the re-encrypted ciphertext is received by the second client machine. Finally, the system is configured to generate, by the one or more hardware processors of the second client machine, a resultant plaintext based on the re-encrypted ciphertext, and a private key of the second public-private key pair of the second user using a probabilistic decryption algorithm.

In yet another aspect, a computer program product including a non-transitory computer-readable medium having embodied therein a computer program for a lattice-based homomorphic proxy re-encryption scheme is provided. The computer readable program, when executed on a computing device, causes the computing device to receive by a first client machine and a second client machine via corresponding one or more hardware processors, a plurality of public parameters from a trusted third party server, wherein the plurality of public parameters comprises a security parameter, a number of encryption levels and a bit value. Further, the computer readable program, when executed on a computing device, causes the computing device to generate, via one or more hardware processors of the first client machine, a first public-private key pair of a first user based on the plurality of public parameters and a user index using a probabilistic key generation algorithm. Furthermore, the computer readable program, when executed on a computing device, causes the computing device to simultaneously generate, via one or more hardware processors of a second client machine, a second public-private key pair of a second user based on the plurality of public parameters and the user index using the probabilistic key generation algorithm. Furthermore, the computer readable program, when executed on a computing device, causes the computing device to generate, via the one or more hardware processors of the first client machine, a ciphertext based on a plaintext associated with the first user, the public key from the first public-private key pair and the plurality of public parameters using a probabilistic encryption algorithm. Furthermore, the computer readable program, when executed on a computing device, causes the computing device to transmit, via the one or more hardware processors of the first client machine, the ciphertext to a proxy server machine, wherein the ciphertext is received by the proxy server machine. Furthermore, the computer readable program, when executed on a computing device, causes the computing device to perform a computation, via one or more hardware processors of the proxy server machine, on the ciphertext using a Fully Homomorphic Encryption (FHE) based technique. Furthermore, the computer readable program, when executed on a computing device, causes the computing device to generate, via the one or more hardware processors of the first client machine, a re-encryption key based on the first public-private key pair of the first user, a public key of the second user and the plurality of public parameter using a probabilistic re-encryption key generation algorithm. Furthermore, the computer readable program, when executed on a computing device, causes the computing device to transmit, via the one or more hardware processors of the first client machine, the generated re-encryption key to the proxy server machine, wherein the re-encryption key is received by the proxy server machine. Furthermore, the computer readable program, when executed on a computing device, causes the computing device to generate, via the one or more hardware processors of the proxy server machine, a re-encrypted ciphertext based on the re-encryption key, the ciphertext and the plurality of public parameters using a probabilistic re-encryption algorithm. Furthermore, the computer readable program, when executed on a computing device, causes the computing device to transmit, via the one or more hardware processors of the proxy server machine, the re-encrypted ciphertext to the second client machine, wherein the re-encrypted ciphertext is received by the second client machine. Finally, the computer readable program, when executed on a computing device, causes the computing device to generate, by the one or more hardware processors of the second client machine, a resultant plaintext based on the re-encrypted ciphertext, and a private key of the second public-private key pair of the second user using a probabilistic decryption algorithm.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
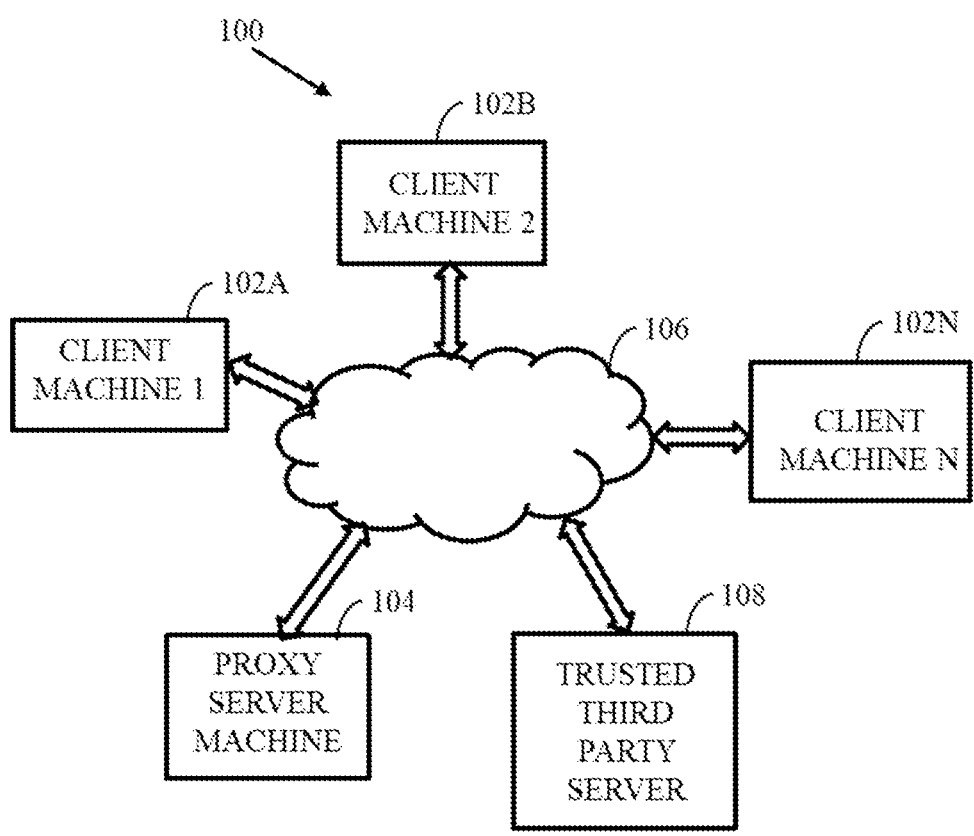
FIG. 1A is a functional block diagram of a system for a lattice-based homomorphic proxy re-encryption scheme, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Generally, Homomorphic Proxy Re-Encryption (HPRE) allows a delegator to encrypt his/her data with his/her own public key while enabling homomorphic evaluations and conversions of the ciphertexts towards different public keys. Furthermore, by applying a re-encryption operation on the evaluated ciphertext, the receiver can decrypt it only with his own secret key. The re-encryption is done with re-encryption keys generated by the delegators and sent to the cloud server in advance.

A use-case scenario of a HPRE including a private inference application is explained herein to better understand the challenges and limitations of conventional approaches. The scenario explaining the conventional approach is from a healthcare domain, where a user Alice (a patient), Bob (hospital server with a trained Machine Learning model for disease identification) and Charlie (Medical Insurance provider). For patient Alice to claim medical insurance for her undergoing medical treatment at the hospital, she needs to send her information (reports with her Personal Identification Information or PII) to the hospital server Bob, who can perform inference on her inputs and help in identification of the disease. This output is then sent to Charlie, who acknowledges the output and provides the insurance coverage accordingly. To avoid any leakage of Alice's PII, she can encrypt her inputs using FHE and send to Bob for private inference. The output of Bob will still remain encrypted under Alice's public keys. Hence, this requires that the result obtained by Bob is sent to Alice for decryption, who then forwards the result to Charlie for further processing. To avoid such multiple rounds of communication as in conventional approaches, the present disclosure utilizes an enhanced Homomorphic Proxy Re-encryption, where in the re-encryption keys can be stored with Bob. After performing private inference on Alice's inputs, Bob can now re-encrypt the resulting ciphertext towards Charlie's keys. Thus, the lattice based HPRE approach disclosed herein enables the output to be directly sent to Charlie for decryption and further processing.

Embodiments herein provide a method and system for a lattice-based homomorphic proxy re-encryption scheme. Initially, a first client machine and a second client machine receive a plurality of public parameters from a trusted third party server. The plurality of public parameters comprises a security parameter, a number of encryption levels and a bit value. Further, a first public-private key pair of a first user is generated by the first client machine based on the plurality of public parameters and a user index using a probabilistic key generation algorithm. simultaneously, a second public-private key pair of a second user is generated by a second client machine based on the plurality of public parameters and the user index using the probabilistic key generation algorithm. Post generating the public-private key pair of the first and second client machine, the first client machine generates a ciphertext based on a plaintext associated with the first user, the public key from the first public-private key pair and the plurality of public parameters using a probabilistic encryption algorithm. Further, the ciphertext is transmitted by the first client machine to the proxy server machine and the ciphertext is received by the proxy server machine. After receiving the ciphertext, the proxy server machine performs a computation on the ciphertext using a Fully Homomorphic Encryption (FHE) based technique. Further, a re-encryption key is generated by the first client machine, based on the first public-private key pair of the first user, a public key of the second user and the plurality of public parameter using a probabilistic re-encryption key generation algorithm. The generated re-encryption key is transmitted by the first client machine to the proxy server. The proxy server receives the re-encryption key and generates a re-encrypted ciphertext based on the re-encryption key, the ciphertext and the plurality of public parameters using a probabilistic re-encryption algorithm. The proxy server further transmits the re-encrypted ciphertext to the second client machine and the second client machine generates a resultant plaintext based on the re-encrypted ciphertext, and a private key of the second public-private key pair of the second user using a probabilistic decryption algorithm.

In an embodiment, the lattice based HPRE technique of the present disclosure is designed for Brakerski-Gentry-Vaikunathan (BGV) protocol. The BGV protocol belongs to the second generation of FHE schemes. Security of BGV stems from the hardness of the Ring-Learning with Errors (RLWE) problem. BGV encodes plaintext and ciphertext as polynomials where each coefficient of polynomial belongs to a Ring R. In BGV, the encryption procedure maps input from plaintext space to output from ciphertext space. Broadly speaking, encryption is done by concealing the plaintext message with an almost random mask that is computed using the public key. The output of encryption is typically two elements of the ciphertext space; the first of which contains the masked plaintext data whereas the second contains auxiliary information that can be used in the decryption procedure. Decryption uses the secret key and the auxiliary information in the ciphertext to remove the mask and recover the plaintext message.

Referring now to the drawings, and more particularly to FIGS. 1A through 3, where similar reference characters denote corresponding features consistently throughout the figures, there are shown preferred embodiments and these embodiments are described in the context of the following exemplary system and/or method.

FIG. 1A is a functional block diagram of a system 100 for the lattice-based homomorphic proxy re-encryption scheme, according to some embodiments of the present disclosure. The system 100 includes a plurality of client machines 102A, 102B through 102N, a proxy server machine 104, a network 106, and a trusted third party server 108. The plurality of client machines 102A through 102N, the proxy server machine 104 and the trusted third party server 108 connected by the network 106.

In an embodiment, the network 106 can be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 102 through communication links.

Figure 1B:
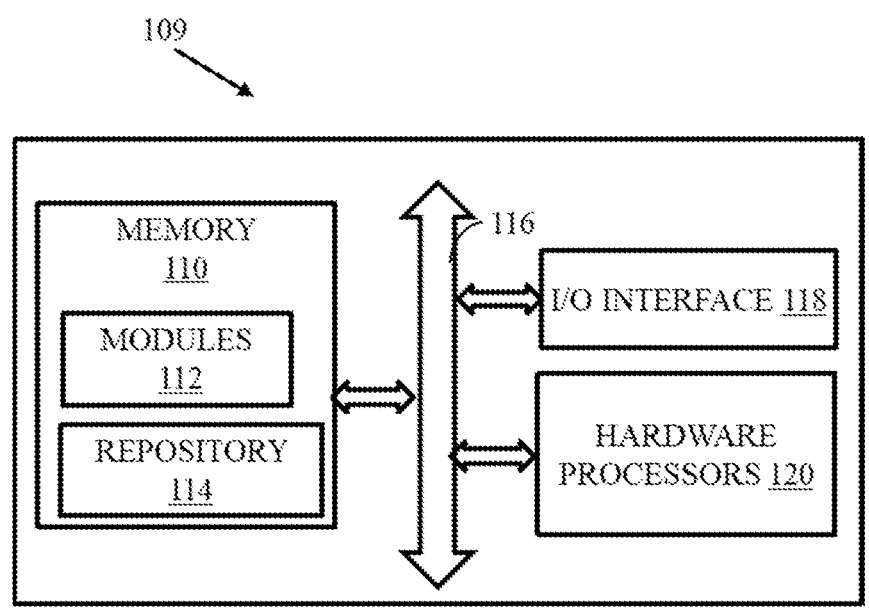
FIG. 1B is a functional block diagram of a computing device associated with the system of FIG. 1A, according to some embodiments of the present disclosure.

In an embodiment, the plurality of client machines 102A through 102N, the proxy server machine 104, and the trusted third party server 108 may be implemented in a computing device as shown in FIG. 1B. The plurality of client machine 102A through 102N, the proxy server machine 104, and the trusted third party server 108 can be a hand-held device, a laptop or other portable computer, a tablet computer, a mobile phone, a PDA, a smartphone, and a desktop computer. The client machine 102 and the proxy server machine 104 may also be implemented in a workstation, a mainframe computer, a server, and a network server.

FIG. 1B is a functional block diagram of the computing device 109 associated with the system of FIG. 1A implementing the proxy server machine 104, according to some embodiments of the present disclosure. The computing device 107 is otherwise in communication with hardware processors 120, at least one memory such as a memory 110, an I/O interface 118. The hardware processors 120, memory 110, and the Input/Output (I/O) interface 118 may be coupled by a system bus such as a system bus 116 or a similar mechanism. In an embodiment, the hardware processors 120 can be one or more hardware processors.

The I/O interface 118 may include a variety of software and hardware interfaces, for example, a web interface, a graphical user interface, and the like. The I/O interface 118 may include a variety of software and hardware interfaces, for example, interfaces for peripheral device(s), such as a keyboard, a mouse, an external memory, a printer and the like. Further, the interface 118 may enable the server machine 104 to communicate with other devices, such the client machine 102 via the network 106, web servers and external databases and the like.

The I/O interface 118 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 118 may include one or more ports for connecting a number of computing systems with one another or to another server computer. The I/O interface 118 may include one or more ports for connecting a number of devices to one another or to another server.

The one or more hardware processors 120 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 120 is configured to fetch and execute computer-readable instructions stored in the memory 110.

The memory 110 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 110 includes a plurality of modules 112. The memory 110 also includes a data repository 114 for storing data processed, received, and generated by the plurality of modules 112.

The plurality of modules 112 include programs or coded instructions that supplement applications or functions performed by the server machine 104 for the lattice-based homomorphic proxy re-encryption scheme. The plurality of modules 112, amongst other things, can include routines, programs, objects, components, and data structures, which performs particular tasks or implement particular abstract data types. The plurality of modules 112 may also be used as, signal processor(s), state machine(s), logic circuitries, and/or any other device or component that manipulates signals based on operational instructions. Further, the plurality of modules 112 can be used by hardware, by computer-readable instructions executed by the one or more hardware processors 120, or by a combination thereof. The plurality of modules 112 can include various sub-modules (not shown). The plurality of modules 112 may include computer-readable instructions that supplement applications or functions performed by the system 100 for the lattice-based homomorphic proxy re-encryption scheme.

The data repository 114 may include a plurality of abstracted piece of code for refinement and data that is processed, received, or generated as a result of the execution of the plurality of modules in the module(s) 112.

Although the data repository 114 is shown internal to the system 100, it will be noted that, in alternate embodiments, the data repository 114 can also be implemented external to the system 100, where the data repository 114 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

As understood by ordinary person skilled in the art, the client machines 102A through 102N has functional components similar to functional components of the proxy server machine 104 and the trusted third party server machine 108 as depicted by computing device 107 in FIG. 2 and not repeated herein for brevity. The components perform functions in accordance with instructions stored in memory block of the client device enabling the client device to communicate with the server 104.

Figure 2A:
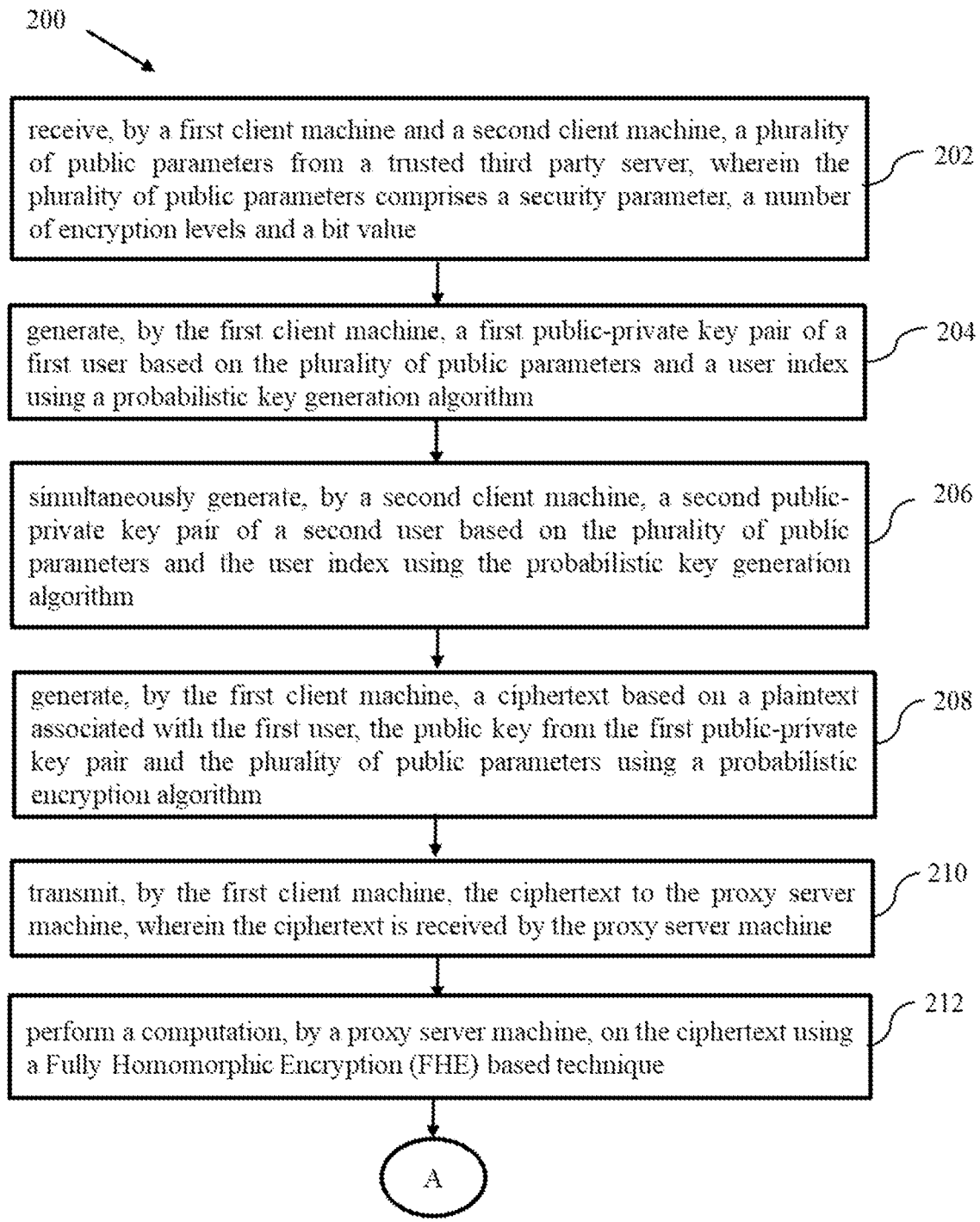
FIGS. 2A and 2B are exemplary flow diagrams for a method for a lattice-based homomorphic proxy re-encryption scheme implemented by the system of FIG. 1A, in accordance with some embodiments of the present disclosure.
Figure 2B:
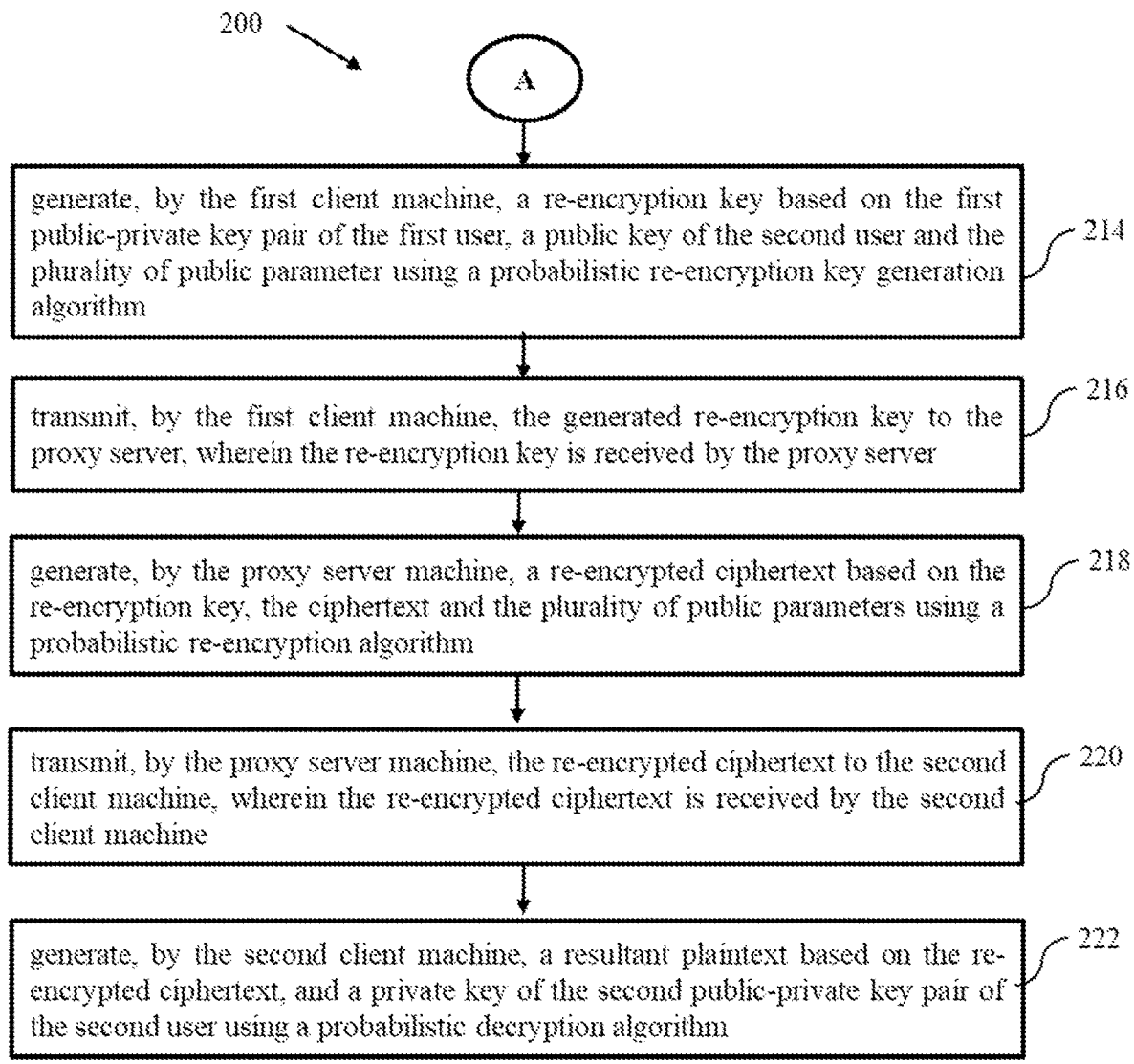
Figure 3:
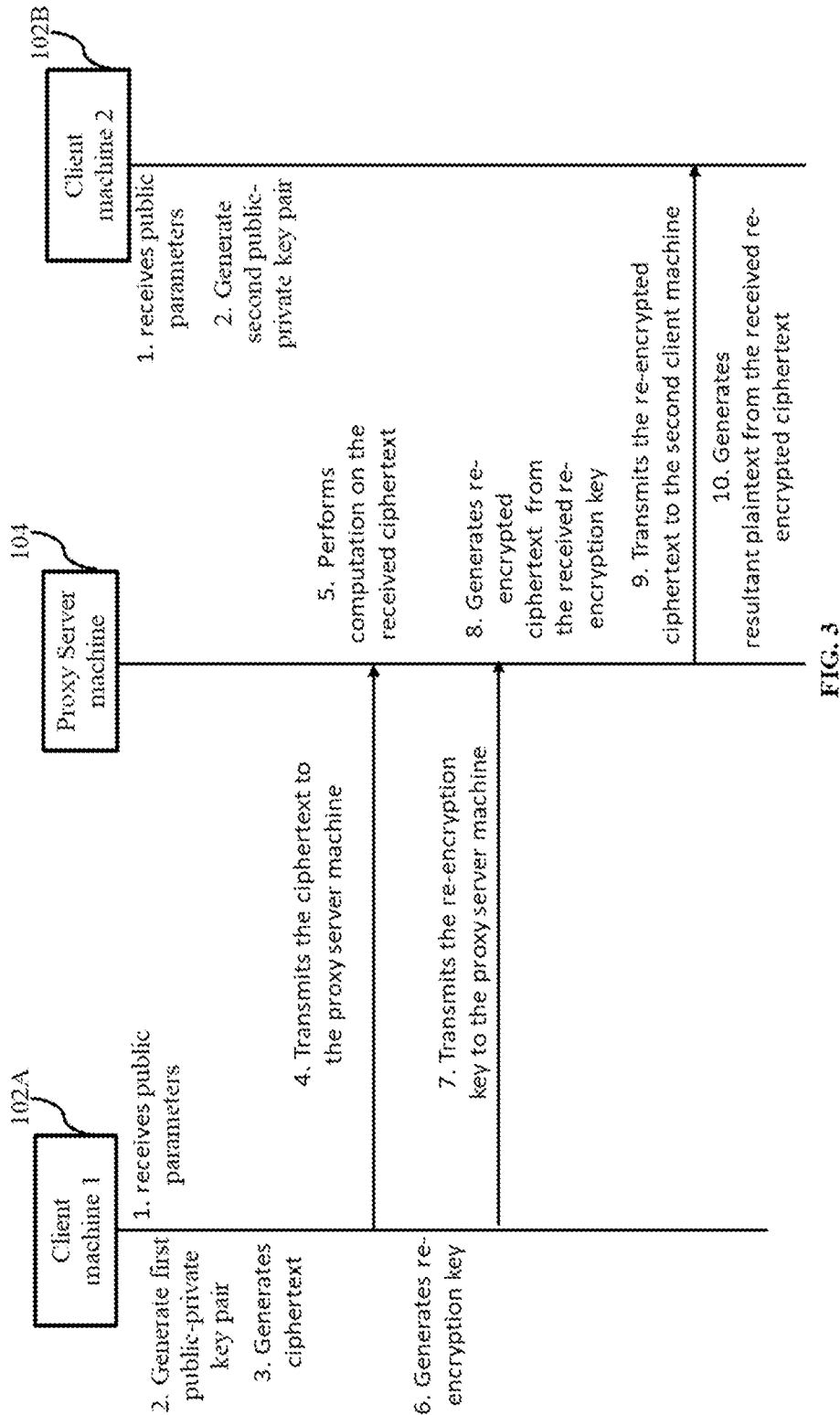
FIG. 3 illustrates a swim lane diagram illustrating the method for the lattice-based homomorphic proxy re-encryption scheme, in accordance with some embodiments of the present disclosure.

FIGS. 2A and 2B are exemplary flow diagrams for a processor implemented method for the lattice-based homomorphic proxy re-encryption scheme implemented by the system of FIG. 1A and FIG. 1B according to some embodiments of the present disclosure. In an embodiment, the computing device 107, implementing the server 104, comprises one or more data storage devices or the memory 110 operatively coupled to the one or more hardware processor(s) 120 and is configured to store instructions for execution of steps of the method 200 by the one or more hardware processors 120. The steps of the method 200 of the present disclosure will now be explained with reference to the components or blocks of the system 107 as depicted in FIG. 1B and the steps of flow diagram as depicted in FIG. 2A and FIG. 2B. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors of corresponding to the first client machine (any client machine from 102A through N) and the second client machine (any client machine from 102A through N other than the first client machine) receives the plurality of public parameters from the trusted third party server. The plurality of public parameters includes the security parameter, the number of encryption levels and the bit value. For example, the bit value indicates a learning scheme associated with a Homomorphic Proxy Re-Encryption (HPRE) scheme, wherein the learning scheme is one of a) Learning With Errors (LWE) and b) Ring Learning With Errors (RLWE). For example, the present disclosure includes a Setup(K) function which takes the security parameter K as input and returns a set of public parameters params, shared by a plurality of users. For example, the pseudocode for the Setup(k) is given below.

---
Pseudocode 1:
1. Input: the security parameter κ, the number of levels L and a bit b, where b determines whether the parameters to be set are for LWE-based scheme or an RLWE based scheme. L determines the number of levels of the circuit, with L being the input level and 0 being the output level.
2. Let $\mu = \mu(\kappa, L, b)$, and modulus as q. μ is the setup algorithm which initializes values κ, L and b as per the requirements. q is the ciphertext modulus, i.e., the value of the a ciphertext lies in the range of $[0, q - 1]$.
3. Set n and compute $N = (2n + 1) \log q$. Set $\chi$ as the Gaussian noise distribution.
4. Return public parameters params : $(n, N, q, \chi)$.
---

At step 204 of the method 200, the one or more hardware processors of the first client machine generates the first public-private key pair of a first user (for example, Alice) based on the plurality of public parameters and the user index using the probabilistic key generation algorithm. In an embodiment, the probabilistic key generation algorithm is a Fully Homomorphic Encryption (FHE) based technique.

At step 206 of the method 200, the one or more hardware processors of the second client machine simultaneously generating the second public-private key pair of the second user (for example, Charlie) based on the plurality of public parameters and the user index using the probabilistic key generation algorithm.

In an embodiment, the first and second public-private key pair corresponding to the first user/the first client machine and the second user/second client machine are generated using the function KeyGen(i, params). The said function is a probabilistic function which takes as input a user index i and the plurality of public parameters params and returns the public-private key pair ($pk_i$, $sk_i$) of user i. For example, the pseudocode for key generation function is given below.

---
Pseudocode 2: KeyGen(i, params)
For j = L down to 0, do:
  Pick s' $\in_r \chi^n$
  Set value $s_j = (1, s'[1], \ldots \ldots s'[n]) = (1, s') \in R_q^{n+1}$
  Set $s_j' = s_j \otimes s_j \in R_q^{(n+1)C_2}$
  Set $A' \in_r R_q^{N*n}$
  Set $e \in_r \chi^n \in_r$. Set $b = A's' + 2e$.

Set public key PK as A which is the (n + 1) column matrix consisting of b followed by then columns of –A'.
Set $s_j'' = \text{BitDecomp}(s_j', q_j)$.
Compute $\tau_{s_{j+1}''} \to s_j = \text{SwitchKeyGen}(s_j'', s_{j-1})$ )
---

At step 208 of the method 200, the one or more hardware processors of the first client machine generates the ciphertext based on the plaintext associated with the first user, the public key from the first public-private key pair and the plurality of public parameters using the probabilistic encryption algorithm. In an embodiment, the probabilistic encryption algorithm is a FHE based algorithm.

In an embodiment, the first client machine generates the ciphertext using the function Encrypt(m, $pk_i$, params). The said encryption function is a probabilistic function which takes as input a plaintext m∈M, the public key $pk_i$ of a user i and public parameters params and returns a ciphertext $C_i$ corresponding to m which is allowed to be re-encrypted towards another user. The ciphertext $C_i$ is termed as original ciphertext. For example, the pseudocode for encryption function is given below.

---
Pseudocode 3: Encrypt (m, $pk_i$, params)
Given as input the plaintext m' $\in R_2$,
  set m = (m', 0, . . . , 0) $\in R_q^{n+1}$.
Pick r $\in_r R_2^N$
Compute ciphertext $c = m + A^T r$
---

At step 210 of the method 200, the one or more hardware processors of the first client machine transmits the ciphertext to the proxy server machine and the ciphertext is received by the proxy server machine.

At step 212 of the method 200, the one or more hardware processors of the proxy server machine performing the computation on the ciphertext using the FHE based technique. In an embodiment, the computation is to perform a private inference on the data of the first user or the client machine 1. For example, when a server which computes a linear regression model for a given input x, wherein the server has a pre-trained linear regression model containing weights W and bias term b. So, for a given encrypted input x, the server computes res=wx+b, where x is encrypted and hence res is also encrypted.

At step 214 of the method 200, the one or more hardware processors of the first client machine generates the re-encryption key based on the first public-private key pair of the first user, the public key of the second user and the plurality of public parameter using the probabilistic re-encryption key generation algorithm. In an embodiment, the re-encryption key generation algorithm is an FHE based technique.

In an embodiment, the method of generating the re-encryption key by the first client machine based on the private-public key pair of the first user, the public key of the second user and the plurality of public parameter using the probabilistic re-encryption key generation algorithm includes the following steps. Initially, a plurality of random matrices are generated using a random matrix generation technique. For example, the plurality of random matrices comprises a first random matrix, a second random matrix and a third random matrix. Further, powers of two for the first random matrix is computed by multiplying each element of the first random matrix with increasing powers of two. After computing powers of two, a first key component is generated based on a public key from the second public-private key pair of the second user and powers of two matrix corresponding to the first random matrix. Further, a second key component is generated by encrypting the second random matrix using the public key from the first public-private key pair of the first user and the third random matrix. Finally, the re-encryption key is generated by combining the first key component and the second key component.

In an embodiment, the re-encryption key is generated using the function ReKeyGen($sk_i$, $pk_i$, $pk_j$, params). The re-encryption key generation function is a probabilistic function which takes as input the private-public key pair $sk_i$, $pk_i$ of the delegator i, the public key $pk_j$ of delegatee j and public parameter params, and returns a re-encryption key $RK_{i \to j}$ that can re-encrypt ciphertexts from user i towards user j. For example, the pseudocode for the ReKeyGen($sk_i$, $pk_i$, $pk_j$, params) is given below:

```
pseudocode 4: ReKeyGen(sk_i, pk_i, pk_j, params)
Generate the re-encryption key to enable re-encryption from two
public keys pk_i, pk_j as below:
    Pick s'_11 ∈_r χ^n.
    Compute s'_12 such that s'_1 = s'_11 + s'_12 mod q.
    Compute s_11 = (1, s'_11) ∈ R_q^{n+1}
    Compute s_12 = (0, s'_12) ∈ R_q^{n+1}
    Pick r' ∈_R R_2^N
    Compute re-key component RK_1 = (pk_j + PowersOf2(s_11)).
    Compute re-key component RK_2 = s_12 + pk_i r'.
    Return RK_{pk_i → pk_j} = {RK_1, RK_2}
```

At step 216 of the method 200, the one or more hardware processors of the first client machine transmits the generated re-encryption key to the proxy server, wherein the re-encryption key is received by the proxy server (for example, Bob).

At step 218 of the method 200, the one or more hardware processors of the proxy server machine 104 generates the re-encrypted ciphertext based on the re-encryption key, the ciphertext and the plurality of public parameters using the probabilistic re-encryption algorithm. For example, the probabilistic re-encryption algorithm is an FHE based technique.

In an embodiment, the method of generating the re-encrypted ciphertext by the proxy server machine 104 based on the re-encryption key, the ciphertext and the plurality of public parameters using the probabilistic re-encryption algorithm includes the following steps. Initially, a Bit Decomposition Ciphertext (BDC) is computed based on the ciphertext. The bit decomposition converts each element of a matrix into a corresponding binary value. After, computing the BDC, a first ciphertext component is computed by multiplying the computed BDC with the first key component associated with the re-encryption key. Further, a second ciphertext component is computed by multiplying the ciphertext with the second key component associated with the re-encryption key. Finally, the re-encrypted ciphertext is generated by combining the first ciphertext component and the second ciphertext component.

In an embodiment, the re-encrypted ciphertext is generated using the function Re-Encrypt($RK_{i \to j}$, $C_i$, params). The re-encryption function is a probabilistic function which takes as input the re-encryption key $RK_{i \to j}$, original ciphertext $C_i$ encrypted under $pk_i$ and public parameters params and returns ciphertext $C_j$ encrypted under the public key $pk_j$. The ciphertext $C_j$ is termed as re-encrypted ciphertext. For example, the pseudocode for the re Re-Encrypt( ) is given below in pseudocode 5. Referring to the pseudocode 5, Scale( ) method changes the modulus of ciphertext from $q_i$ to $q_{i-1}$.

```
Pseudocode 5: Re - Encrypt(RK_{i→j}, C_i, params).
Given as input a first level ciphertext C_1 and rekey RK_{pk_i → pk_j} =
{RK_1, RK_2}, re-encrypt it to user j as below:
    Compute re-encrypted ciphertext C_2 as below:
    C_2 = BitDecomp(C_1)^T · RK_1 + C_1 · RK_2
    Return C_2 = Scale(C_2, q_i, q_{i-1}, params)
```

At step 220 of the method 200, the one or more hardware processors of the proxy server machine 104 transmits the re-encrypted ciphertext to the second client machine and is received by the second client machine.

At step 220 of the method 200, the one or more hardware processors of the second client machine generates the resultant plaintext based on the re-encrypted ciphertext, and the private key of the second public-private key pair of the second user using a probabilistic decryption algorithm, for example an FHE based technique.

In an embodiment, the resultant plaintext is generated using the function Decrypt($C_j$, $sk_j$, params). The decryption function is a deterministic algorithm which takes as input the private key $sk_j$ of a user j, an original ciphertext $C_j$, and public parameters params and returns a plaintext m or the error symbol $\perp$ if the ciphertext is invalid. For example, the formula for computing the resultant plaintext is $m = [\langle C, s \rangle_q]_2$.

Experimentation Details:

In an embodiment, the present disclosure is experimented using Number Theory Library (NTL), which provides support for arithmetic in Rings/Fields. For example, the system is initialized with security parameters like plaintext modulus p (for example, p=2), ciphertext modulus q (which is set according to security level), dimension of the vector n=512, N=(n+1). log q, and level L=1. The performance of FHE schemes (measured in milliseconds) and the security level mostly depend on parameters n and q, as can be seen in Table I. Now referring to Table I, SL denotes Security Level parameter and q is the modulus and the value of n=152.

In an embodiment, If the value of n is fixed and the value of q is decreased, the security level increases, and performance improves (time decreases). Methods like AddMod, MulMod, SubMod are used with parameter q to mimic the ciphertext modulus during the computations. NTL provides SetNum Threads( ) method which can be used to enable parallelism during the computation. To make full use of this parallelism, the present disclosure utilizes NTL EXEC RANGE to parallelize the implementation wherever necessary. NTL was compiled with NTL THREADS-on and NTL SAFE VECTORS-on options to ensure that parallel computations happen correctly. The present implementation was tested in Intel i5-10310U CPU with 8 cores with max frequency of 4.4 Ghz and 16 GB of RAM.

TABLE I

| Module | SL = 128, q = 1909091 | SL = 192, q = 174763 | SL = 256, q = 32553 |
|---|---|---|---|
| Setup | 0.1 | 0.1 | 0.1 |
| KeyGen | 1602 | 1455 | 1198 |
| ReKeyGen | 425 | 364 | 337 |
| Encrypt | 306 | 257 | 226 |
| ReEncrypt | 1 | 1 | 1 |
| Decrypt | 0.11 | 0.11 | 0.11 |

In an embodiment, the computational complexity of the present disclosure is compared with the existing techniques and is identified that the computational complexity of the present disclosure is very less and hence the present disclosure is highly efficient than the existing approaches.

In an embodiment, the present disclosure performs homomorphic evaluation of two ciphertexts associated with a used based on the corresponding public key, two ciphertexts encrypted under the public key of the user and the plurality of public parameters, wherein the homomorphic evaluation comprises multiplication and addition.

In an embodiment, the homomorphic evaluation using addition is performed using the function Eval-Add($pk_i$, $C_1$, $C_2$, params). The said summation function is a deterministic algorithm which takes as input a public key $pk_i$, two ciphertexts $C_1$ and $C_2$ encrypted under public key of user i and public parameters params and returns the summation of the two ciphertexts as $C_{sum}$, evaluated homomorphically. For example, the pseudocode for Eval-Add($pk_i$, $C_1$, $C_2$, params) function is given below.

```
Pseudocode 6: Eval - Add(pk_i, C_1, C_2, params)
Compute C_sum = C_1 + C_2 mod q_i
    Return C_sum = Scale(C_sum, q_i, q_{i-1}, params)
```

In an embodiment, the homomorphic evaluation using multiplication is performed using the function Eval-Mul($pk_i$, $C_1$, $C_2$, params). The said multiplication algorithm is a deterministic algorithm which takes as input a public key $pk_i$, two ciphertexts $C_1$ and $C_2$ encrypted under public key of user i and public parameters params and returns the product of the two ciphertexts as $C_{mult}$, evaluated homomorphically. For example, the pseudocode for Eval-Mul($pk_i$, $C_1$, $C_2$, params) function is given below.

```
Pseudocode 7: Eval - Mul(pk_i, C_1, C_2, params)
Compute coefficient vector: C_mult = L_{C1,C2} (x ⊗ x).
    Return product: C_mult = Scale(C_mult, q_i, q_{i-1}, params)
```

In an embodiment, the present disclosure performs batch evaluation of a plurality of ciphertexts of a plurality of users based on the plurality of ciphertexts, a plurality of public keys and the plurality of public parameters using a deterministic homomorphic batch evaluation algorithm.

In an embodiment, the batch evaluation of the present disclosure is performed using the function Batch-Eval ($pk_i$, . . . , $pk_j$, $C_1$, . . . , $C_j$, $pk_t$, params): The said batch evaluation function is a deterministic algorithm which takes as input public keys $pk_i$, . . . , $pk_j$, ciphertexts $C_i$ . . . $C_j$ encrypted under the corresponding public keys of users i to j and public parameters params. It evaluates the ciphertexts as per the operation specified, re-encrypts the evaluated ciphertext to the delegatee $pk_t$ and returns the re-encrypted ciphertext Ct. For example, the pseudocode for Batch-Eval ($pk_i$, . . . , $pk_j$, $C_1$, . . . , $C_j$, $pk_t$, params) function is given below.

```
Pseudocode 8; Batch - Eval(pk_i, . . . , pk_j , C_1, . . .,
C_j, pk_t, params)
1) If all public keys pk_1, . . . , pk_j are unique, skip to step 4.
2) Else, if all public keys are distinct, proceed as below.
3) ∀_i ∈ [j], if i ≠ t, compute the following:
    Obtain RK_{pk_i→pk_j}= ReKeyGen(sk_i, pk_i, pk_j, params)
    Obtain re-encrypted ciphertext C_i'= Re −
Encrypt(RK_{i→j}, C_i, params)
4) For summation, obtain:
```

```
batch_eval= Eval − Add(pk_i, C_1, C_2, params)
5) For product, obtain:
    batch_eval = Eval − Mul(pk_i, C_1, C_2, params)
6) Return output:
    batch_eval= Scale(batch_eval, q_i, q_{i-1}, params)
```

In an embodiment, the proof of correctness of the ecrypt ($C_i$, $sk_i$, params) is given below. Here, the dot product of BitDecomp($C_1$) and $e_2$ is small, since BitDecomp($C_1$) is in $R_2^N$. Similarly, the dot product of $C_1$ and re-encryption key's term $A^T r'$. is small since r' is in $R_2^N$. Overall, we have $C_2$ as a valid encryption of m under private key $s_2$, with noise that is larger by a small additive factor.

Proof of correctness for Decrypt($C_i$, $sk_i$, params):
$pk_j \cdot s_2 = 2e_2 \in R_q^N$, where $pk_j$ and $s_2$ are the public and private keys of the delegatee.
Let $C_2$ be a re-encrypted ciphertext under public key $pk_j$.
The algorithm decrypts as below:

$$\langle C_2, s_2 \rangle = \langle BitDecomp(C_1)^T \cdot RK_1 + C1 \cdot RK_2, s_2 \rangle$$

$$= BitDecomp(C_1)^T \cdot RK_1 \cdot s_2 + C_1 \cdot RK_2 \cdot s_2$$

$$= BitDecomp(C_1)^T (pk_j \cdot s_2 + \text{Powers Of } 2(s_{11}))$$

$$= BitDecomp(C_1)^T (2e_2 + \text{Powers Of } 2(s_{11})) + C_1 \cdot s_{12} + C_1 \cdot A^T r'.$$

$$= 2\langle BitDecomp(C_1), e_2 \rangle + \langle C_1, s_{11} \rangle + \langle C_1, s_{12} \rangle + C_1 \cdot A^T r'.$$

$$= 2\langle BitDecomp(C_1), e_2 \rangle + \langle C_1, s_{11} + s_{12} \rangle + C_1 \cdot A^T r'.$$

$$= \langle C_1, s_1 \rangle$$

In an embodiment, the present disclosure provides sematic security, collision resistance, enables fine grained access and optimization using Bootstrapping. Semantic security provides protection from extracting plaintext from ciphertext by an intruder. Collision resistance means intruder/attacker cannot generate a ciphertext which can be replaced with the re encrypted ciphertext fine grained access control means the re encrypted ciphertext can only be decrypted by a particular user for whom it was meant and cannot be decrypted by any other user. Optimization using bootstrapping means, if the re encryption procedure requires a certain number of multiplications, this can be optimized using bootstrapping procedure to get fresh ciphertext.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of a lattice-based homomorphic proxy re-encryption scheme. The present disclosure provides a unidirectional, single-hop HPRE scheme from the LWE assumption which is Chosen Plaintext Attack (CPA) secure. CPA is an attack model for cryptanalysis which presumes that the attacker can obtain the ciphertexts for arbitrary plaintexts. The goal of the attack is to gain information that reduces the security of the encryption scheme.

Further, the present disclosure is based on the widely accepted BGV algorithm that supports both levelled FHE operations as well as arbitrary number of ciphertexts with unique and secure re-encryption key generation. Further, the present disclosure provides batch evaluation of ciphertexts, in order to enable re-encryption and evaluation of multiple ciphertexts (supporting both features where all ciphertexts are encrypted under a single public key, as well as ciphertexts being encrypted under distinct public keys). The batch-evaluation technique would enable batch processing.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:
receiving, by a first client machine and a second client machine via corresponding one or more hardware processors, a plurality of public parameters from a trusted third party server, wherein the plurality of public parameters comprises a security parameter, a number of encryption levels and a bit value;
generating, via one or more hardware processors of the first client machine, a first public-private key pair of a first user based on the plurality of public parameters and a user index using a probabilistic key generation algorithm;
simultaneously generating, via one or more hardware processors of a second client machine, a second public-private key pair of a second user based on the plurality of public parameters and the user index using the probabilistic key generation algorithm;
generating, via the one or more hardware processors of the first client machine, a ciphertext based on a plaintext associated with the first user, the public key from the first public-private key pair and the plurality of public parameters using a probabilistic encryption algorithm;
transmitting, via the one or more hardware processors of the first client machine, the ciphertext to a proxy server machine, wherein the ciphertext is received by the proxy server machine;
performing a computation, via one or more hardware processors of the proxy server machine, on the ciphertext using a Fully Homomorphic Encryption (FHE) based technique;
generating, via the one or more hardware processors of the first client machine, a re-encryption key based on the first public-private key pair of the first user, a public key of the second user and the plurality of public parameter using a probabilistic re-encryption key generation algorithm, wherein generating the re-encryption key by the first client machine based on the first public-private key pair of the first user, the public key of the second user and the plurality of public parameter using the probabilistic re-encryption key generation algorithm comprises:
generating a plurality of random matrices using a random matrix generation technique, wherein the plurality of random matrices comprises a first random matrix, a second random matrix and a third random matrix;

computing powers of two of the first random matrix by multiplying each element of the first random matrix with increasing powers of two;

generating a first key component based on a public key from the second public-private key pair of the second user and powers of two of the first random matrix;

generating a second key component by encrypting the second random matrix using the public key from the first public-private key pair of the first user and the third random matrix; and generating the re-encryption key by combining the first key component and the second key component;

transmitting, via the one or more hardware processors of the first client machine, the generated re-encryption key to the proxy server machine, wherein the re-encryption key is received by the proxy server machine;

generating, via the one or more hardware processors of the proxy server machine, a re-encrypted ciphertext based on the re-encryption key, the ciphertext and the plurality of public parameters using a probabilistic re-encryption algorithm;

transmitting, via the one or more hardware processors of the proxy server machine, the re-encrypted ciphertext to the second client machine, wherein the re-encrypted ciphertext is received by the second client machine; and generating, by the one or more hardware processors of the second client machine, a resultant plaintext based on the re-encrypted ciphertext, and a private key of the second public-private key pair of the second user using a probabilistic decryption algorithm.

2. The processor implemented method of claim 1, wherein generating the re-encrypted ciphertext by the proxy server machine based on the re-encryption key, the ciphertext and the plurality of public parameters using the probabilistic re-encryption algorithm comprises:

computing a Bit Decomposition Ciphertext (BDC) based on the ciphertext, wherein bit decomposition converts each element of a matrix into a corresponding binary value;

computing a first ciphertext component by multiplying the computed BDC with the first key component associated with the re-encryption key;

computing a second ciphertext component by multiplying the ciphertext with the second key component associated with the re-encryption key; and generating the re-encrypted ciphertext by combining the first ciphertext component and the second ciphertext component.

3. The processor implemented method of claim 1, comprises performing homomorphic evaluation of two ciphertexts associated with a used user based on the corresponding public key, two ciphertexts encrypted under the public key of the user and the plurality of public parameters, wherein the homomorphic evaluation comprises multiplication and addition.

4. The processor implemented method of claim 1, comprises performing batch evaluation of a plurality of ciphertexts of a plurality of users based on the plurality of ciphertexts, a plurality of public keys and the plurality of public parameters using a deterministic homomorphic batch evaluation algorithm.

5. The processor implemented method of claim 1, wherein the probabilistic key generation algorithm, the probabilistic encryption algorithm and the probabilistic decryption algorithm are based on the FHE techniques.

6. The processor implemented method of claim 1, wherein the bit value indicates a learning scheme associated with a Homomorphic Proxy Re-Encryption (HPRE) scheme, wherein the learning scheme is one of a) Learning With Errors (LWE) and b) Ring Learning With Errors (RLWE).

7. A system comprising:

a first client machine, a second client machine, a proxy server machine and a trusted third party server, wherein the proxy server machine, the first client machine and the second client machine comprises at least one memory storing programmed instructions; one or more Input/Output (I/O) interfaces; and one or more hardware processors of the proxy server machine, the first client machine and the second client machine are operatively coupled to a corresponding at least one memory, wherein the system is configured to:

receive, by the first client machine and the second client machine via corresponding one or more hardware processors, a plurality of public parameters from the trusted third party server, wherein the plurality of public parameters comprises a security parameter, a number of encryption levels and a bit value;

generate, via the one or more hardware processors of the first client machine, a first public-private key pair of a first user based on the plurality of public parameters and a user index using a probabilistic key generation algorithm;

simultaneously generate, via the one or more hardware processors of a second client machine, a second public-private key pair of a second user based on the plurality of public parameters and the user index using the probabilistic key generation algorithm;

generate, via the one or more hardware processors of the first client machine, a ciphertext based on a plaintext associated with the first user, the public key from the first public-private key pair and the plurality of public parameters using a probabilistic encryption algorithm;

transmit, via the one or more hardware processors of the first client machine, the ciphertext to the proxy server machine, wherein the ciphertext is received by the proxy server machine;

perform a computation, via one or more hardware processors of the proxy server machine, on the ciphertext using a Fully Homomorphic Encryption (FHE) based technique;

generate, via the one or more hardware processors of the first client machine, a re-encryption key based on the first public-private key pair of the first user, a public key of the second user and the plurality of public parameter using a probabilistic re-encryption key generation algorithm, wherein generating the re-encryption key by the first client machine based on the first public-private key pair of the first user, the public key of the second user and the plurality of public parameter using the probabilistic re-encryption key generation algorithm comprises:

generating a plurality of random matrices using a random matrix generation technique, wherein the plurality of random matrices comprises a first random matrix, a second random matrix and a third random matrix;

computing powers of two of the first random matrix by multiplying each element of the first random matrix with increasing powers of two;

generating a first key component based on a public key from the second public-private key pair of the second user and powers of two of the first random matrix;

generating a second key component by encrypting the second random matrix using the public key from the first public-private key pair of the first user and the third random matrix; and generating the re-encryption key by combining the first key component and the second key component;

transmit, via the one or more hardware processors of the first client machine, the generated re-encryption key to the proxy server machine, wherein the re-encryption key is received by the proxy server machine;

generate, via the one or more hardware processors of the proxy server machine, a re-encrypted ciphertext based on the re-encryption key, the ciphertext and the plurality of public parameters using a probabilistic re-encryption algorithm;

transmit, via the one or more hardware processors of the proxy server machine, the re-encrypted ciphertext to the second client machine, wherein the re-encrypted ciphertext is received by the second client machine; and generate, by the one or more hardware processors of the second client machine, a resultant plaintext based on the re-encrypted ciphertext, and a private key of the second public-private key pair of the second user using a probabilistic decryption algorithm.

8. The system of claim 7, wherein generating the re-encrypted ciphertext by the proxy server machine based on the re-encryption key, the ciphertext and the plurality of public parameters using the probabilistic re-encryption algorithm comprises:

computing a Bit Decomposition Ciphertext (BDC) based on the ciphertext, wherein bit decomposition converts each element of a matrix into a corresponding binary value;

computing a first ciphertext component by multiplying the computed BDC with the first key component associated with the re-encryption key;

computing a second ciphertext component by multiplying the ciphertext with the second key component associated with the re-encryption key; and generating the re-encrypted ciphertext by combining the first ciphertext component and the second ciphertext component.

9. The system of claim 7, comprises performing homomorphic evaluation of two ciphertexts associated with a user based on the corresponding public key, two ciphertexts encrypted under the public key of the user and the plurality of public parameters, wherein the homomorphic evaluation comprises multiplication and addition.

10. The system of claim 7, comprises performing batch evaluation of a plurality of ciphertexts of a plurality of users based on the plurality of ciphertexts, a plurality of public keys and the plurality of public parameters using a deterministic homomorphic batch evaluation algorithm.

11. The system of claim 7, wherein the probabilistic key generation algorithm, the probabilistic encryption algorithm and the probabilistic decryption algorithm are based on the FHE techniques.

12. The system of claim 7, wherein the bit value indicates a learning scheme associated with a Homomorphic Proxy Re-Encryption (HPRE) scheme, wherein the learning scheme is one of a) Learning With Errors (LWE) and b) Ring Learning With Errors (RLWE).

13. One or more non-transitory machine-readable information storage mediums comprising one or more instructions to:

receive, by a first client machine and a second client machine via corresponding one or more hardware processors, a plurality of public parameters from a trusted third party server, wherein the plurality of public parameters comprises a security parameter, a number of encryption levels and a bit value;

generate, via one or more hardware processors of the first client machine, a first public-private key pair of a first user based on the plurality of public parameters and a user index using a probabilistic key generation algorithm;

simultaneously generate, via one or more hardware processors of a second client machine, a second public-private key pair of a second user based on the plurality of public parameters and the user index using the probabilistic key generation algorithm;

generate, via the one or more hardware processors of the first client machine, a ciphertext based on a plaintext associated with the first user, the public key from the first public-private key pair and the plurality of public parameters using a probabilistic encryption algorithm;

transmit, via the one or more hardware processors of the first client machine, the ciphertext to a proxy server machine, wherein the ciphertext is received by the proxy server machine;

performing a computation, via one or more hardware processors of the proxy server machine, on the ciphertext using a Fully Homomorphic Encryption (FHE) based technique;

generate, via the one or more hardware processors of the first client machine, a re-encryption key based on the first public-private key pair of the first user, a public key of the second user and the plurality of public parameter using a probabilistic re-encryption key generation algorithm, wherein generating the re-encryption key by the first client machine based on the first public-private key pair of the first user, the public key of the second user and the plurality of public parameter using the probabilistic re-encryption key generation algorithm comprises:

generating a plurality of random matrices using a random matrix generation technique, wherein the plurality of random matrices comprises a first random matrix, a second random matrix and a third random matrix;

computing powers of two of the first random matrix by multiplying each element of the first random matrix with increasing powers of two;

generating a first key component based on a public key from the second public-private key pair of the second user and powers of two of the first random matrix;

generating a second key component by encrypting the second random matrix using the public key from the first public-private key pair of the first user and the third random matrix; and generating the re-encryption key by combining the first key component and the second key component;

transmit, via the one or more hardware processors of the first client machine, the generated re-encryption key to the proxy server machine, wherein the re-encryption key is received by the proxy server machine;

generate, via the one or more hardware processors of the proxy server machine, a re-encrypted ciphertext based on the re-encryption key, the ciphertext and the plurality of public parameters using a probabilistic re-encryption algorithm;

transmit, via the one or more hardware processors of the proxy server machine, the re-encrypted ciphertext to the second client machine, wherein the re-encrypted ciphertext is received by the second client machine; and generate, by the one or more hardware processors of the second client machine, a resultant plaintext based on the re-encrypted ciphertext, and a private key of the second public-private key pair of the second user using a probabilistic decryption algorithm.

14. The one or more non-transitory machine-readable information storage mediums of claim 13, wherein generating the re-encrypted ciphertext by the proxy server machine based on the re-encryption key, the ciphertext and the plurality of public parameters using the probabilistic re-encryption algorithm comprises:

computing a Bit Decomposition Ciphertext (BDC) based on the ciphertext, wherein bit decomposition converts each element of a matrix into a corresponding binary value;

computing a first ciphertext component by multiplying the computed BDC with the first key component associated with the re-encryption key;

computing a second ciphertext component by multiplying the ciphertext with the second key component associated with the re-encryption key; and generating the re-encrypted ciphertext by combining the first ciphertext component and the second ciphertext component.

15. The one or more non-transitory machine-readable information storage mediums of claim 13, comprises performing homomorphic evaluation of two ciphertexts associated with a user based on the corresponding public key, two ciphertexts encrypted under the public key of the user and the plurality of public parameters, wherein the homomorphic evaluation comprises multiplication and addition.

16. The one or more non-transitory machine-readable information storage mediums of claim 13, comprises performing batch evaluation of a plurality of ciphertexts of a plurality of users based on the plurality of ciphertexts, a plurality of public keys and the plurality of public parameters using a deterministic homomorphic batch evaluation algorithm.

17. The one or more non-transitory machine-readable information storage mediums of claim 13, wherein the probabilistic key generation algorithm, the probabilistic encryption algorithm and the probabilistic decryption algorithm are based on the FHE techniques.

* * * * *